J. WICKS.
ORE WASHER.
No. 64,178. Patented Apr. 23, 1867.
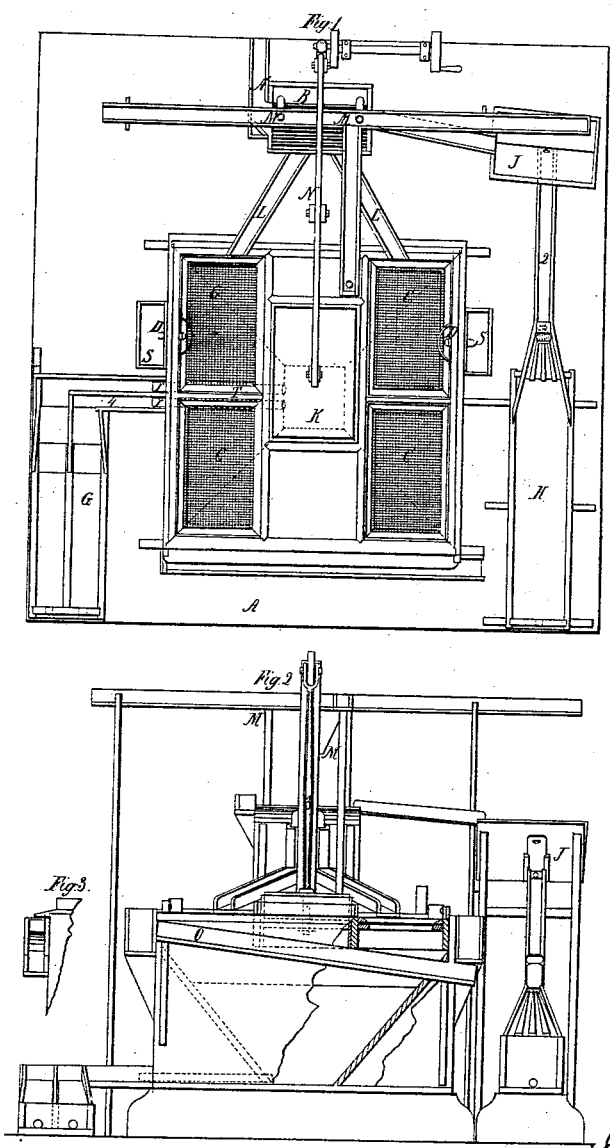

United States Patent Office

JOHN WICKS, OF GREENLAND, MICHIGAN.

Letters Patent No. 64,178, dated April 23, 1867.

IMPROVED ORE-WASHER.

The Schedule referred to in these Letters Patent and making part of the same.

TO ALL WHOM IT MAY CONCERN:

Be it known that I, JOHN WICKS, of Greenland, in the county of Ontonagon, and State of Michigan, have invented a new and improved Ore-Washer; and I do hereby declare that the following is a full, clear, and exact description thereof, reference being had to the accompanying drawings, forming part of this specification.

The nature of my invention consists in the combination of an ore-separator with a slime-pit, and the form of the separator and its construction with its slime-pit. It also consists in the combination of a walking-beam and connecting-rod with a hutch. It further consists in the combination of buddles with slime-pits.

To enable others skilled in the art to make and use my invention, I will proceed to describe its construction and operation.

Figure 1 is a top plan view of my improved ore-washer.

Figure 2 is an end elevation of the same.

Figure 3 is a section of fig. 2.

Letters of like name and kind refer to like parts in each of the figures.

A represents the base upon which my ore-washer stands; A' is a launder which connects with the slime-separator B. This slime-separator is covered with grates to prevent large pieces of rock which may be accidentally brought up from choking the separator. M M are pipes provided for the purpose of bringing clear water to the bottom of the separator by which the sand is washed out of the launder L. The mud is floated off through the slime-pit J, from which it passes through the spout 2 into the slime-buddle H, where it is cleansed of its copper. The sand passes from the launder L into the sieves C, and the coarse copper settles upon the bottom of the sieves by the gigging motion which is communicated to the water in the hutch K, by a suitable plunger attached to the walking-beam N and connecting-rod 3. The sand passes from the front sieves to the back ones to prevent any copper from passing off with the poor sand. The poor sand is washed over into the launder O, and is thrown away. The finer particles of copper pass through the sieve into the hutch K, and from thence through the pipes r r, and spout 4, into the buddle G, where they are cleansed. The coarse copper accumulating upon the sieve C prevents the greater part of fine sand from going into the hutch K, and is kept at a depth of from three-fourths to one and one-fourth inch upon the sieve, and is drawn off through the pipe D into the box S. T is a support for the sieves, and projects some four inches upon the inside to give a more uniform action to the water under the sieves. This machine is perfect in its operation, and is capable of washing forty tons of ore in twenty hours.

Having thus described my invention, what I claim as new, and desire to secure by Letters Patent of the United States, is—

1. The combination of the separator B, slime-pit J, buddle H and their connections, the sieves C C C C, and hutch K, all for the purposes and substantially as described.

2. I also claim the walking-beam N, connecting-rod 3, in combination with the hutch K, substantially as described.

3. I claim the buddle H, in combination with the slime-pit J, for the purposes described.

4. I also claim the buddle G, in combination with the hutch K, substantially as described.

JOHN WICKS.

Witnesses:
F. G. WHITE,
H. K. COLE.